(12) United States Patent
Clarke et al.

(10) Patent No.: US 7,891,312 B2
(45) Date of Patent: Feb. 22, 2011

(54) THIN FILM FORMING

(75) Inventors: Peter Clarke, Slough (GB); Will Taylor, Slough (GB); Sergey Vodvud, Stupino (RU); Allen Donnelly, Slough (GB)

(73) Assignee: Mars (UK) Limited, Slough, Berkshire (GB)

( * ) Notice: Subject to any disclaimer, the term of this patent is extended or adjusted under 35 U.S.C. 154(b) by 1081 days.

(21) Appl. No.: 10/483,486

(22) PCT Filed: Jul. 10, 2002

(86) PCT No.: PCT/GB02/03198

§ 371 (c)(1),
(2), (4) Date: May 18, 2005

(87) PCT Pub. No.: WO03/005832

PCT Pub. Date: Jan. 23, 2003

(65) Prior Publication Data
US 2006/0134284 A1    Jun. 22, 2006

(30) Foreign Application Priority Data
Jul. 13, 2001   (GB) .................. 0117176.8

(51) Int. Cl.
B05C 1/08    (2006.01)

(52) U.S. Cl. ............... 118/13; 118/18; 118/216; 118/221; 118/244; 118/255; 118/261

(58) Field of Classification Search ............ 118/13, 118/18, 216, 221, 244, 255, 261; 426/306, 426/307; 427/402, 428.09; 425/141, 363, 425/367
See application file for complete search history.

(56) References Cited

U.S. PATENT DOCUMENTS

| | | | |
|---|---|---|---|
| 3,840,679 A | 10/1974 | Liepa et al. | |
| 3,973,044 A | 8/1976 | Giddey et al. | |
| 4,117,054 A | 9/1978 | Salo | |
| 4,173,492 A * | 11/1979 | Pollard | 106/415 |
| 4,519,304 A | 5/1985 | Ripani | |
| 5,379,950 A | 1/1995 | Kuster | |
| 6,213,749 B1 * | 4/2001 | Carle | 425/141 |
| 6,251,454 B1 | 6/2001 | Layfield | |
| 6,823,795 B2 * | 11/2004 | Willcocks et al. | 101/492 |
| 2001/0028905 A1 | 10/2001 | Lefebvre | |

FOREIGN PATENT DOCUMENTS

EP    0 304 570 A2    1/1989

* cited by examiner

*Primary Examiner*—Laura Edwards
(74) *Attorney, Agent, or Firm*—Fitzpatrick, Cella, Harper & Scinto

(57) ABSTRACT

Apparatus and method for producing a regular film of foodstuff, comprising a first roll on to which foodstuff is applied in fluid or plastic form, and an independent second roll spaced from the first by a distance $t_1$ on to which a film of foodstuff of thickness $t_1$ is applied by means of the first roll. Also apparatus and method for producing a layered foodstuff produce additionally comprising a doctor blade on the second roll and a rotary former including a number of cavities in which the foodstuff is collected.

25 Claims, 7 Drawing Sheets

THIN FILM FORMING

BACKGROUND OF THE INVENTION

The present invention relates to a process and apparatus for the continuous production of a regular thin film of human and pet foodstuffs. In particular the invention extends to the use of such films in the production of layered products. The invention is particularly concerned with the production and use of regular films of confectionery such as nougat, caramel, chocolate, and sugar, as well as other human foodstuffs such as meat products, ice cream, baked product compositions and decorative butter and spreads.

Layered products, especially layered confectionery products, are well known. Generally they are formed by chocolate paste being applied to a so-called refiner roll from which a film is scraped and collected in an appropriate former to form the desired product. By controlling the speed of the refiner roll on which the chocolate paste is spread into a film, it is possible to remove the film as a continuous sheet. By varying the angle of the scraper blade, the film can be collected as a wrinkled, partially compressed bar of confectionery product of a length equal to the width of the roll. The width of the bar, or the quantity scraped from the roll can be mechanically controlled by intermittent stopping and starting of the forming roll. A take-off device then removes the formed bar from the scraper blade while the roll is stationary. The length of the separate bars may be further controlled by mechanical means such as small sharp protrusions at defined intervals along the scraper blade breaking the film into discrete lengths.

In some prior art examples the chocolate paste used in such processes has a higher fat content than is typical for regular chocolate products. Solid fragments of this chocolate may be fed into a breaker unit where they are kneaded before they are passed on to the refiner roll where they are formed into a film. In some cases, in addition to the kneading, some water, syrup, or other vehicle for adding water may be added to the paste to help generate a consistency which will enable it to be formed into a film. However care must be taken that this water is distributed evenly throughout the paste otherwise an irregular film and consequently irregular products will be formed.

In other prior art examples, solid fragments of tempered chocolate are fed into a breaker unit where they are broken before being passed on to a refiner roll where they are formed into a film. The fat content of the tempered chocolate will be lower than for the previous example, and there is also no need for the addition of any water to transform the chocolate into a state which can form a film.

The paste may be cooled on the refiner roll to further induce fat crystallisation in a controlled way and to thereby produce a stable film which can be removed as one piece by the scraper blade. The chocolate is also subjected to further cooling after it has been formed into the desired wrinkled, partially compressed shape to set the plasticised chocolate into a solid product.

FIG. 1 shows, in general form, one such process for the production of a layered chocolate product. Solid fragments of chocolate are kneaded into a paste 2 and fed to a series of rolls 4, 6, and 8 on which a film 10 of plasticised chocolate is formed. After a sufficient time period has elapsed to form the relatively uniform film at a suitable temperature to be moulded, arranged or otherwise formed into a layered product, the film is removed from the surface of roll 8 by means of a scraper 12. The layered product 14 is formed on the scraper and is transferred by any suitable means 16 to a conveyor 18 which passes the products 14 to a cooler 20.

There are some problems with the processes of the prior art for producing layered chocolate products. The process for forming the film of chocolate on the roller is unreliable which results in variations in film thickness and an inconsistent weight profile of the product. The consequence of this inconsistency is that each layered chocolate product produced has to be inspected in order that products which fail to meet the required standard are rejected. In some cases, an extra enrobing layer of foodstuff (normally more chocolate) is coated on the layered chocolate product both for additional strength and for aesthetic reasons. If the layered chocolate product has defects in the outer surface, extra enrobing foodstuff (e.g. chocolate) may be required to produce a smooth enrobing outer surface. This is not only inefficient but may also reduce the benefits of having a layered chocolate or other foodstuff product. Further, the use of a castellated doctor blade to cut the film into suitable lengths results in a large amount of the chocolate film passing round the roller and being reworked, thereby changing its properties, or causing inefficiencies.

An object of the present invention is to overcome the problems of the prior art systems as outlined above in connection with the production of layered chocolate products, and to apply the solution to the human and pet food industry in general. In particular, it is the object of the present invention to provide a method and apparatus for the production of a regular film of human or pet foodstuffs (for example chocolate, nougat, caramel, toffee, sugar, creams, ice creams, wafer batter, meat products, pet food etc. or combinations of these) which may subsequently be used in the production of a layered foodstuff product.

SUMMARY OF THE INVENTION

According to a first aspect of the present invention, there is provided apparatus for producing a regular film of foodstuff, comprising a first roll on to which foodstuff is applied in a fluid or plastic form, and an independent second roll spaced from the first by a distance $t_1$ on to which a film of foodstuff of thickness $t_1$ is applied by means of the first roller. Optionally an independent third roll, separated from the second roll by a gap $t_2$, is present to smooth the film of foodstuff on the second roll.

The film produced by this apparatus is of a uniform depth across the width of the second roll and thereby avoids the problems associated with the inconsistencies of the film produced by the means of the three roll refiner of the prior art. The use of a fluid, preferably liquid, feed, in contrast to the solid fragments broken into a sort of paste as used in the prior art, allows the production of a significantly more uniform film. In addition, the apparatus of the present invention may be operated without an applied pressure between the rolls since high pressures are not required to help break down further any solid fragments remaining. This therefore reduces the substantial running costs associated with maintaining a high pressure around the three refiner rolls. As well as reducing the running costs, the lower pressure is significantly safer to operate and it is easier for the operator to monitor and maintain the system at the lower pressure.

In a preferred embodiment, the apparatus is used to produce a regular film of chocolate. More preferably, the chocolate is tempered chocolate thereby allowing the production of high quality products. With the apparatus of the present invention, it is possible to use all types of chocolate in an unamended form. It is not necessary to alter the fat content of the chocolate or to add any water to the liquid to enable it to be used. It can be used with the standard fat content of, for example, 28 to 30% by weight and produce regular films of a controlled thickness.

Preferably in this embodiment, the second roll is at a lower temperature than the first roll. This temperature differential between the two rolls enables the efficient transfer of liquid chocolate from the first roll to the second. Preferably, the first roll is maintained at a temperature in the range 10 to 55° C., more preferably 20 to 40° C., even more preferably 32 to 38° C. depending on the quality and type of chocolate being applied to the roll. For example, tempered chocolate must be maintained at a bulk temperature of below 32° C. Therefore, the rolls are preferably maintained at a temperature below this value. If the residence time on the roll is very short, the temperature of the roll may slightly exceed this value to provide the necessary heat transfer to the tempered chocolate to maintain it at the desired temperature without causing the bulk temperature of the chocolate to rise too high.

Preferably the second roll in this embodiment is maintained at a temperature in the range −20 to 30° C., more preferably −15 to 5° C. The exact temperature will depend on the size and dimension of the roll and also the speed of rotation i.e. the residence time of the film on the roll. The initially liquid film applied to the second roll by the first has to be cooled to a sufficient degree to allow it to be removed in the form of a film, layered or rippled product. As stated above, the difference in temperature between the two rolls enables the liquid chocolate to be transferred efficiently from the first roll to the second. In addition, at temperatures in the preferred ranges listed above, the liquid chocolate starts to form a plasticised film of chocolate on the second roll which can subsequently be formed into layered products.

Optionally the second roll is chilled by means of a coolant liquid passing through the centre of the roll. However, any suitable means for cooling the roll may be employed.

Preferably, the third roll (when present) is maintained at a temperature such that transfer from the second roll is minimised. The third roll simply smoothes out the film on the second roll. In a preferred embodiment, the first and third rolls are maintained at the same temperature. This will enable the same heating source to be used for both rolls thereby minimising the number of components required.

Preferably, $t_1$ and $t_2$ are in the range 0.01 to 20 mm, more preferably 0.1 to 10 mm and more preferably 0.2 to 0.8 mm. In one preferred embodiment, $t_1$ and $t_2$ are equal in order that the third roll may smooth the film on the second roll to a regular thickness of $t_1$. For chocolate films, $t_1$ and $t_2$ are preferably in the range 0.01 to 5 mm, more preferably 0.1 to 1 mm.

In another preferred embodiment for the production of chocolate films, the third roll is supplied with a second foodstuff component which is applied either as a second-film on top of the first on the second roll or in the form of inclusions which become embedded in the first film. In this case, $t_2$ may be greater than $t_1$ by the thickness of the second film or largest diameter of inclusions. Examples of possible secondary components for a chocolate film include creams (e.g. praline, coffee, mint, white, etc.), crushed nuts (e.g. almonds, hazelnuts etc.), inclusions of expanded malted milk confection, biscuit pieces, pieces of fruit (e.g. raisins, sultanas, currants), caramel, nougat, truffle, crispies, meringue pieces, further layers of chocolate (e.g. white chocolate on milk chocolate etc.), ice cream or any combination of the above. In all cases, the first and third rolls are easily moveable relative to the second roll in order that the thickness of the film(s) may be varied depending on the nature of the foodstuffs employed and the product being produced.

As indicated above, for a first film of chocolate, the second foodstuff component which may be added by means of the third roll may be either a solid or a liquid foodstuff. For example, it could be a layer of caramel to go on to a layer of nougat or directly onto chocolate or it may be some ground nuts or pieces of fruit or biscuit pieces to become embedded in a layer of chocolate. The second component is distributed on the first layer in a controlled manner to produce a regular or irregular distribution in the final product as desired. The particle size distribution of the solid inclusions is important if it is desired that the inclusions largely embed themselves in the chocolate film. Preferably, the diameter of the inclusions is in the range of 0.5-6 mm, more preferably 24 mm. The inclusions may be substantially fully embedded in the film, or there may be a layer of inclusions on top of the film, only embedded to a small fraction.

Naturally, there may be more than one additional component added to the first film of chocolate. They may all be of the same form as each other, e.g. two or more additional films, or they may be different, e.g. a second film layer and a layer of inclusions. These additional components may be added by any suitable means e.g. further rolls, hoppers. The apparatus of the present invention may have any number of rolls to produce the desired product. There may be smoothing rolls between the addition of each component, be they another film or a solid inclusion layer, or there may only be a smoothing roll after the addition of the final component or there may be no need for smoothing at all.

Preferably the first roll has a number of narrow troughs in the surface of the roll substantially perpendicular to the axis of rotation of the roll. The liquid chocolate only adheres to the outer surface of the roll and will not adhere to the troughs. The result of this is that a series of parallel films will be formed on the second roll when the chocolate is transferred. The width of these films will determine the length of any product subsequently produced. As a result of the fact that there are a number of parallel films on the second roll rather than one film across the whole width of the roll, the doctor blade can be a simple flat blade in contrast to the castellated blades of the prior art. The film has already been "cut" into appropriate lengths. In addition to the expense saved in using a simple flat blade rather than a castellated blade, this apparatus will avoid the inefficiency and reworking of some of the chocolate in the prior art processes which may change the properties and result in non-uniform products. The liquid chocolate in the troughs will simply run off to a collecting vessel and be recycled.

In another preferred embodiment, the apparatus is used to produce a regular film of sugar products, for example candy. Preferably in this embodiment, the second roll is at a lower temperature than the first roll. Again, this temperature differential between the rolls enables the efficient transfer of the sugar syrup from the first roll to the second. Preferably the first roll is maintained at a temperature in the range 80 to 180° C., more preferably 120 to 150° C., and even more preferably 120 to 140° C. depending on the type of sugar and concentration of solution employed. For example, a 97% sugar syrup (i.e. 3% water) with a suitable viscosity to efficiently transfer from the first roll to the second may be at a temperature in the range of 100 to 150° C., preferably 120 to 140° C. However, a 95% sugar syrup (i.e. 5% water) with a suitable viscosity to efficiently transfer from the first roll to the second may be at a temperature in the range of 90 to 120° C., preferably 100 to 110° C.

Preferably the second roll in this embodiment is maintained at a temperature in the range 15 to 60° C., more preferably 30 to 40° C. Again, the exact temperature is dependent upon a number of features which combine to control the heat transfer between the film of sugar solution and the roll. Primary among these controlling variables is residence time which is affected by the diameter of and speed of rotation of the roll and the relative positions of the first roll and the doctor blade. While on the second roll the sugar solution preferably sets to a sufficient degree to be removed by a doctor blade and to be formed into a layered product. Naturally, the heating or cooling of the second roll is preferably achieved, at least in part, by heat exchange with any available source to maximise the use of thermal energy in the plant.

Alternatively, a gated hopper may be employed in place of the first roller to produce a film of sugar syrup of a controlled height and width on the second roll.

Preferably, the third roll (when present) is maintained at a higher temperature than the second roll. This minimises the amount of sugar solution transferring from the second roll to the third and allows the third roll to either smooth out the film on the second roll or to apply a further film at the top of the first.

In one preferred embodiment, $t_1=t_2$ whereby the third roll acts as a burnishing roll and smoothes the film on the second roll. In another embodiment, $t_2>t_1$ and the third roll supplies a second foodstuff to the second roll in the form of either a second film or as a set of solid inclusions. Of course more than three rolls may be present, and all the "satellite" rolls around the second roll are moveable relative to the second roll both circumferentially and radially.

As for the chocolate embodiment, the first roll preferably has a number of narrow troughs on the surface of the roll, substantially perpendicular to the axis of rotation of the roll. This allows the production of set of parallel films on the second roll which subsequently avoids the need for any castellated doctor blades.

In another preferred embodiment, the apparatus is used to produce a regular film of baked product compositions; for example batter or pastry based products. Preferably in this embodiment, the second roll is at a higher temperature than the first roll so that the wafer product is baked as it passes round the roll. Again, this temperature differential between the rolls enables the efficient transfer of the fluid wafer solution from the first roll to the second.

Again, the exact temperature of the rolls is dependent upon a number of features which combine to control the heat transfer between the wafer composition on the first roll and the second roll. Primary among these controlling variables is residence time which is affected by the diameter of and speed of rotation of the second roll and the relative positions of the first roll and the doctor blade. While on the second roll the wafer composition preferably bakes to a sufficient degree to be removed by a doctor blade and to be formed into a layered product. Naturally, the heating of the second roll is preferably achieved, at least in part, by heat exchange with any available source to maximise the use of thermal energy in the plant.

Preferably, the third roll (when present) is maintained at a lower temperature than the second roll. This minimises the amount of wafer composition which transfers from the second roll to the third and allows the third roll to either smooth out the film formed on the second roll or to apply a further film at the top of the first. In a preferred embodiment, the temperature of the first and third rolls is the same thereby enabling the same heating source to be used for both rolls.

In one preferred embodiment, $t_1=t_2$ whereby the third roll acts as a burnishing roll and smoothes the film on the second roll. In another embodiment, $t_2>t_1$ and the third roll supplies a second foodstuff to the second roll in the form of either a second film or as a set of solid inclusions. Of course more than three rolls may be present, and all the "satellite" rolls around the second roll are moveable relative to the second roll both circumferentially and radially.

As for the chocolate and sugar embodiments, the first roll preferably has a number of narrow troughs on the surface of the roll, substantially perpendicular to the axis of rotation of the roll. This allows the production of set of parallel films on the second roll which subsequently avoids the need for any castellated doctor blades.

In yet another preferred embodiment, the apparatus is used to produce a regular film of pet food products. Preferably in this embodiment, the second roll is at a lower temperature than the first roll. Again, this temperature differential between the rolls enables the efficient transfer of the fluid pet food composition from the first roll to the second.

As before, the exact temperature of the rolls is dependent upon a number of features which combine to control the heat transfer between the film of pet food composition on the first roll and the second roll. Primary among these controlling variables is residence time which is affected by the diameter of and speed of rotation of the roll and the relative positions of the first roll and the doctor blade. While on the second roll the pet food composition preferably sets to a sufficient degree to be removed by a doctor blade and to be formed into a layered product. The heating or cooling of the second roll is preferably achieved, at least in part, by heat exchange with any available source to maximise the use of thermal energy in the plant.

The temperature of the third roll is selected to minimise the amount of pet food composition which is transferred from the second roll to the third and thereby allows the third roll to either smooth out the film on the second roll or to apply a further film at the top of the first. In a preferred embodiment, the temperature of the first and third rolls is the same thereby enabling the same heating source to be used for both rolls.

In one preferred embodiment, $t_1=t_2$ whereby the third roll acts as a burnishing roll and smoothes the film on the second roll. In another embodiment, $t_2>t_1$ and the third roll supplies a second foodstuff to the second roll in the form of either a second film or as a set of solid inclusions. Of course more than three rolls may be present, and all the "satellite" rolls around the second roll are moveable relative to the second roll both circumferentially and radially.

As for the previous embodiments, the first roll preferably has a number of narrow troughs on the surface of the roll, substantially perpendicular to the axis of rotation of the roll. This allows the production of set of parallel films on the second roll which subsequently avoids the need for any castellated doctor blades.

The advantage of the present apparatus is that it can accommodate any material with fluidic properties. For fluid materials, the fat and sugar content can be varied according to the desired products. The present apparatus is flexible enough to be able to accommodate the wide range of fat and sugar contents without having to make substantial changes to the form of the apparatus.

According to a second aspect of the present invention, there is provided apparatus for producing a layered foodstuff product comprising a first roll to which foodstuff is applied in fluid or plastic form, an independent second roll spaced from the first by a distance $t_1$ on to which a film of foodstuff of thickness $t_1$ is applied by means of the first roll, a doctor blade on the second roll to remove the thin film of foodstuff from the surface of this roll, and a rotary former including a number of cavities in which the foodstuff is collected. Optionally, the rotary former includes means as necessary for ejecting the layered product formed. The apparatus optionally also includes an independent third roll separated from the second roll by a gap $t_2$ to smooth the film of foodstuff on the second roll. The third roll may optionally be provided with means for adding a layer of a second foodstuff component on top of the first layer on the second roll. There may optionally be a fourth or more roll to add further layers, either as films or as solid inclusions. Any other suitable means for adding further layers or solid inclusions may also be used, for example hoppers. This second layer may be of any foodstuff component sufficiently fluid to form a relatively uniform layer on the first plasticised layer on the second roll.

The advantages of the apparatus for producing a regular film of foodstuff have been set out above and all the preferred features may equally be applied to this aspect of the invention. The use of a regular film of foodstuff as a feed for the production of a layered products avoids many of the problems of the prior art processes. In particular, the regular film results in the production of more consistent products. Variations in density and shape of the products (as sometimes seen in the prior art) are avoided. This means that the product produced may, if desired, have a more consistent outer surface which will allow for a more consistent thickness of enrobing material when required. The consistency of product will also reduce the need for manual monitoring of the layered products to ensure that the required standards are met. The apparatus may also be used to produce different thicknesses of foodstuff films in order to produce different final products. The apparatus may also be used to produce predetermined variations in thickness of the film within a single product.

Preferably the temperature of the rotary former is carefully controlled to suit the foodstuff being used. It may be either heated or cooled. Cooling or heating in the former may assist in converting a fluidised material into a plasticised solid form which can be manipulated into a layered, rippled or film product. For example, the former may bake the material, crystallise the material through cooling or set proteins by the application of heat. Preferably any temperature control is achieved by means of a liquid passing through the centre of the former. Controlling the temperature of the rotary former centrally is cheaper and easier to control than, for example, blowing a constant stream of gas of a selected temperature over the formed products. Preferably, the temperature of the rotary former is maintained in the range −25 to 20° C. for chocolate applications, and is preferably is the same as that of the second roll, whereby the same temperature controlling liquid can be used to pass through both components. However, even if the temperature of the two components is different, it may be possible to use the same liquid in both components to achieve a different degree of heating or cooling and still benefit from reductions in the duty of the overall system. Of course, the two components may be independently controlled.

The means for ejecting the layered product from the rotary former (when necessary) may be anything suitable, including suction means, gravitational means and physical means. The means selected will vary from foodstuff to foodstuff and will take into consideration factors such as the weight and density of the layered products to be removed and also the strength of the product at the point of ejection from the former. For example, in some cases the product may not be sufficiently heavy or dense to reliably drop out of the rotary former by means of gravity alone. In this case, it may be appropriate to use physical or suction means to eject the product. Possible physical means which could be employed include, but are not limited to, physical rod pushers, blasts of air against a bladder material. In other situations, the product may be of sufficient mass and density to reliably drop out of the former by means of gravity alone. There is therefore no need for any additional ejection means to be employed in this case. It is naturally desirable that all products should be ejected on each rotation of the former, or the doctor blade will try to direct more of the film of foodstuff into an already full cavity on the next rotation of the former.

The conditions for the former will vary depending on the material being formed into a layered product. For example, for chocolate the former will be cool to further set the product, and may be preferably in the range −25 to 20°, more preferably −15 to 10° C. However, for a wafer composition, the temperature is likely to be higher to bake the composition.

The present invention also extends to the method of producing a regular film of foodstuff, the method comprising:
(a) applying fluid or plastic foodstuff to a first roll;
(b) transferring a film of the fluid or plastic foodstuff to a second roll spaced from the first roll by a distance $t_1$ and rotating in an opposite direction;
(c) optionally smoothing out the film on the second roll by means of a third roll, separated from the second roll by a distance $t_2$;
(d) optionally heating or cooling the film of foodstuff sufficiently that it takes the form of a plasticised film.

The method optionally also includes the application of a second foodstuff component to the film by means of the third roll which transfers a second film on top of the first film on the second roll. This second component may be either solid or liquid so long as it is sufficiently fluidised to be able to form a relatively even layer on top of the first film. In this case, the third roll rotates in the same direction as the first roll and in the opposite direction to the second roll. In the case where the third roll smoothes out any striations in the film on the surface of the second roll, it rotates in the same direction as the second roll. Naturally, the invention extends to the use of any number of satelite rolls (or hoppers) around the second roll to add further components or to smooth out the film(s) produced.

The present invention also extends to the method of forming a layered foodstuff product, the method comprising:
(a) applying a fluid or plastic foodstuff to a first roll;
(b) transferring a film of the fluid or plastic foodstuff to a second roll spaced from the first roll by a distance $t_1$ and rotating in an opposite direction;
(c) optionally smoothing out the film on the second roll by means of a third roll, separated from the second roll by a distance $t_2$;
(d) optionally adding a second layer of foodstuff to the film on the second roll by any suitable means;
(e) optionally heating or cooling the film of foodstuff sufficiently that the foodstuff takes the form of a plasticised film;
(f) removing the film of plasticised foodstuff from the second roll in a controlled manner by means of a doctor blade;
(g) receiving the plasticised foodstuff in cavities in a rotary former, the film adopting a predetermined and controlled pattern in each cavity; and
(h) ejecting the formed layered product from the cavities in the rotary former.

The preferred features and advantages associated with the apparatus described above apply equally to the method of operation of the apparatus. In particular, the third roll may optionally be supplied with a second foodstuff component which is sufficiently fluid to form a relatively uniform layer of foodstuff on the film of the first component already formed on the second roller. Once again, in this case, the third roll rotates in the same direction as the first roll and in the opposite direction to the second roll whereas in the case of the third roll smoothing out any striations in the film on the second roll it rotates in the same direction as the second roll.

The invention also extends to the products formed by the method of the present invention. In particular, the invention extends to the forms of layered foodstuff product shown in the accompanying figures. One particularly preferred embodiment is the swirl arrangement shown in FIG. 10. A number of these embodiments have associated advantages which may have a beneficial effect for other aspects of the production process. In particular, the embodiment shown in FIG. 7 in which there is an outer layer of chocolate film before the layered effect inside is set down and, if desired, may result in the use of less or a more controlled amount of chocolate in any subsequent enrobing process. In some cases, it may not be necessary to enrobe the layered product at all, and a physically stable product may be produced with or without enrobing.

Other preferred features and advantages of the various aspects of the present invention will be apparent from the following specific description. The invention may be put into practice in various ways and a number of embodiments will be described by way of example to illustrate the invention with reference to the accompanying drawings, in which:

DETAILED DESCRIPTION OF THE PREFERRED EMBODIMENTS

Figure 1:
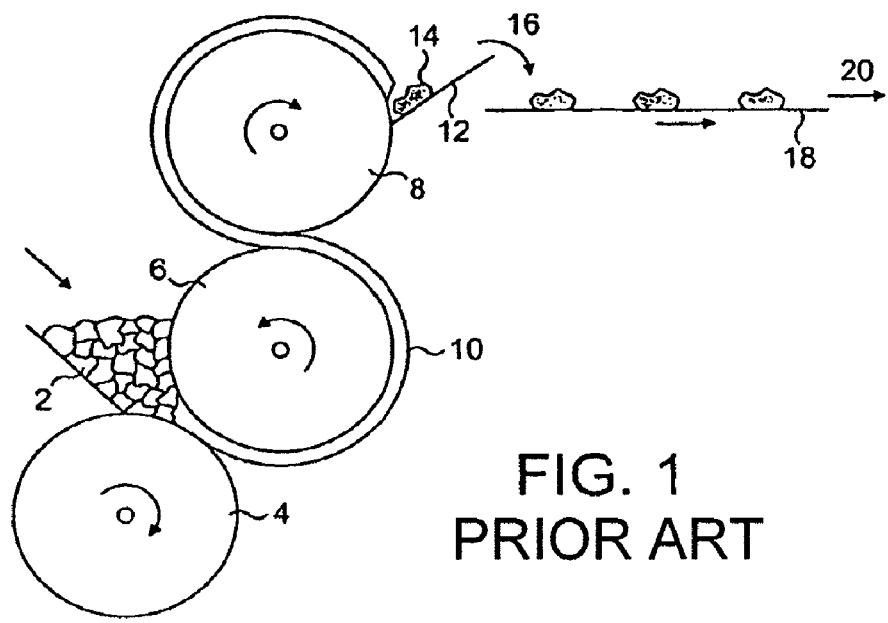
FIG. 1 shows, in general form, one example of a prior art system for the manufacture of a layered foodstuff product.

As described above, FIG. 1 shows a general arrangement for the preparation of a wrinkled, partially compressed bar of confectionery according to a prior art process. Some of the disadvantages of this system are discussed above.

While the examples below refer specifically to the transfer of chocolate from the first roll to the second roll and subsequently to the formation of layered confectionery products, it will be appreciated that the present invention is not limited to use of chocolate alone. As set out above, the present invention is applicable to all human and pet foodstuffs which are liquid or sufficiently fluidic or plastic on application to be easily formed into a regular film of plasticised solid. In addition, any secondary components added to the film on the second roller might be solid or liquid as appropriate. Examples of possible secondary components for a chocolate film include creams (e.g. praline, coffee, mint, white, etc.), crushed nuts (e.g. almonds, hazelnuts etc.), inclusions of expanded malted milk confection, biscuit pieces, pieces of fruit (e.g. raisins, sultanas, currants), caramel, nougat, truffle, crispies, meringue pieces, further layers of chocolate (e.g. white chocolate on milk chocolate etc.), ice cream or any combination of the above.

Figure 2:
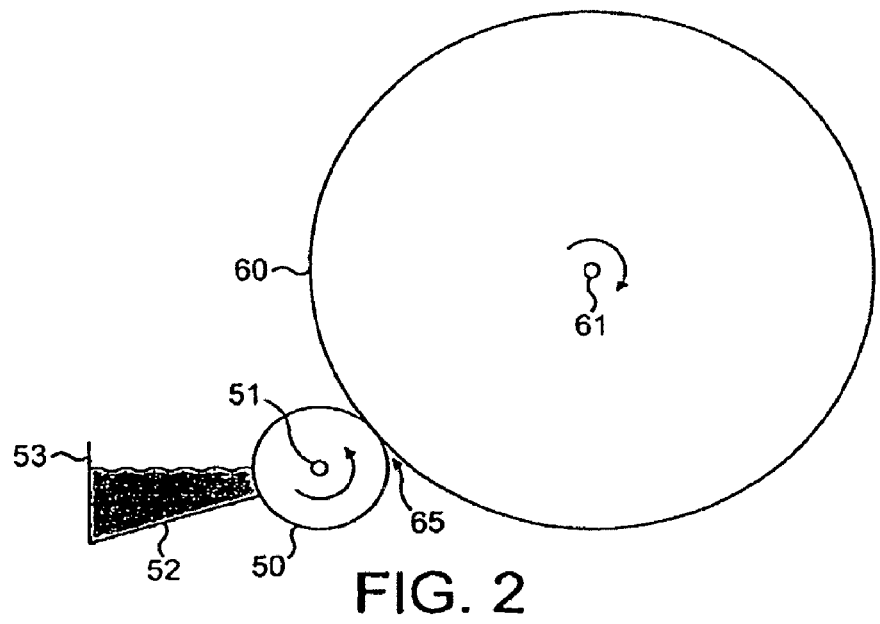
FIG. 2 shows an overview of a first system for the preparation of a regular film of human or pet foodstuff according to the present invention.

FIG. 2 shows a first roll 50 rotating anticlockwise around its central axis 51 as shown by the arrow. To this roll is applied tempered liquid chocolate 52 from a supply vessel 53. The method of supply from vessel 53 to the first roll 50 is not limited in the present application. A regular supply of liquid to the roll by any suitable means can form the basis for the film production of the present invention. The liquid chocolate adheres to the outer surface of the roll 50 and rotates round towards the second roll 60. This second roll is shown to be larger than the first roll although this is not essential to the present invention.

The second roll 60 rotates in the opposite direction to the first roll 50. In this case, the secondary roll rotates in a clockwise direction around its central axis 61 as shown by the arrow in FIG. 2. Of course, the two rolls could rotate in the opposite directions although the relative positions of the two rolls would be changed. The relative positions of the rolls in FIG. 2 is merely exemplary and not limiting. The position of the first roll relative to the position at which the formed film is removed from the second roll by any suitable means, e.g. a doctor blade, may be adjusted as a means of controlling the residence time on the second roll and hence the degree of cooling of the film. The degree of cooling may also be achieved by adjusting the speed of rotation of the roll 60, the diameter of the roll 60 and the temperature of the roll 60. If the film on roll 60 has striations, these may be levelled out by the use of one or more satelite rolls.

As the surface of the first roll (which is coated with liquid chocolate) comes into contact with the second roll in the region 65, chocolate is transferred from the first roll to the second roll. Over the contact zone 65 the chocolate is transferred and levelled out to form a regular film of chocolate on the second roll 60. The gap between the outer surfaces of the two rolls is $t_1$, and hence a film of thickness $t_1$ is formed on the second roll.

Both rolls 50, 60 have their temperatures controlled by temperature control means which are not shown. These temperature control means are preferably liquids of controlled temperature passing through the central region of each roll.

To enable efficient transfer of liquid chocolate from the first roll to the second roll, the second roll 60 is maintained at a lower temperature than the first roll 50. The temperature differential selected will depend on the foodstuff being transferred and the eventual application for the film formed on the second roll. In many cases, it will be desirable that the second roll is maintained at a temperature which will cool the liquid chocolate to a plasticised form so that the film of chocolate may be easily removed in a single piece. As indicated above, if alternative foodstuffs are employed, e.g. wafer, the second roll will be at a higher temperature than the first to bake the composition into a suitably set form.

Figure 3:
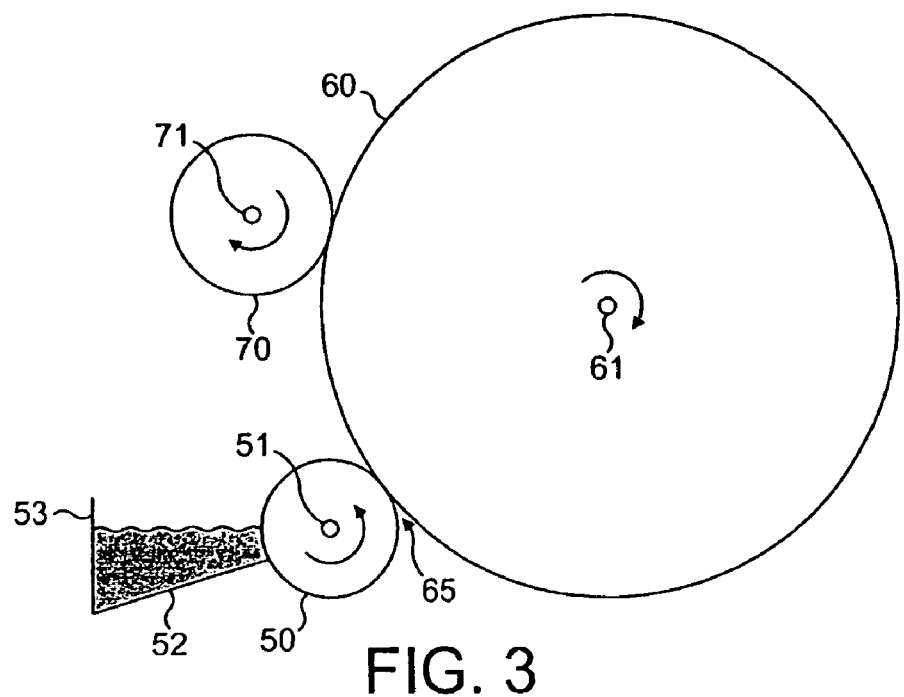
FIG. 3 shows an overview of a second system for the preparation of a regular film of human or pet foodstuff according to the present invention.

As shown in FIG. 3, the system may further include a third, burnishing roll 70 positioned further round the circumference of the second roll 60 than the first roll 50 in the direction of rotation of the second roll. The burnishing roll 70 rotates clockwise around its central axis 71 (i.e. in the same direction as the second roll). The purpose of the burnishing roll 70 is to smooth out any striations in the material surface of the film on the second roll to a thickness $t_2$. This thickness may be varied to suit the material being smoothed and the thickness of film required. The burnishing roll is maintained at a higher temperature than the second roll to minimise the transfer of chocolate from the second roll to the burnishing roll.

Figure 4A:
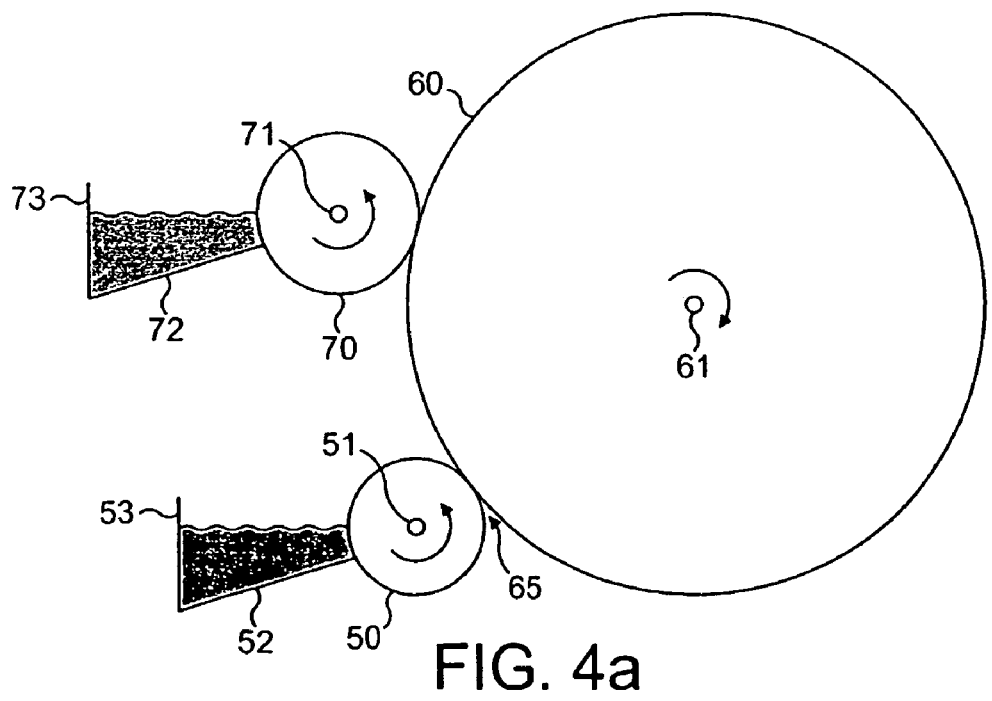
FIG. 4a shows an overview of a system for the preparation of a regular film together with a second layer or secondary component according to the present invention.
Figure 4B:
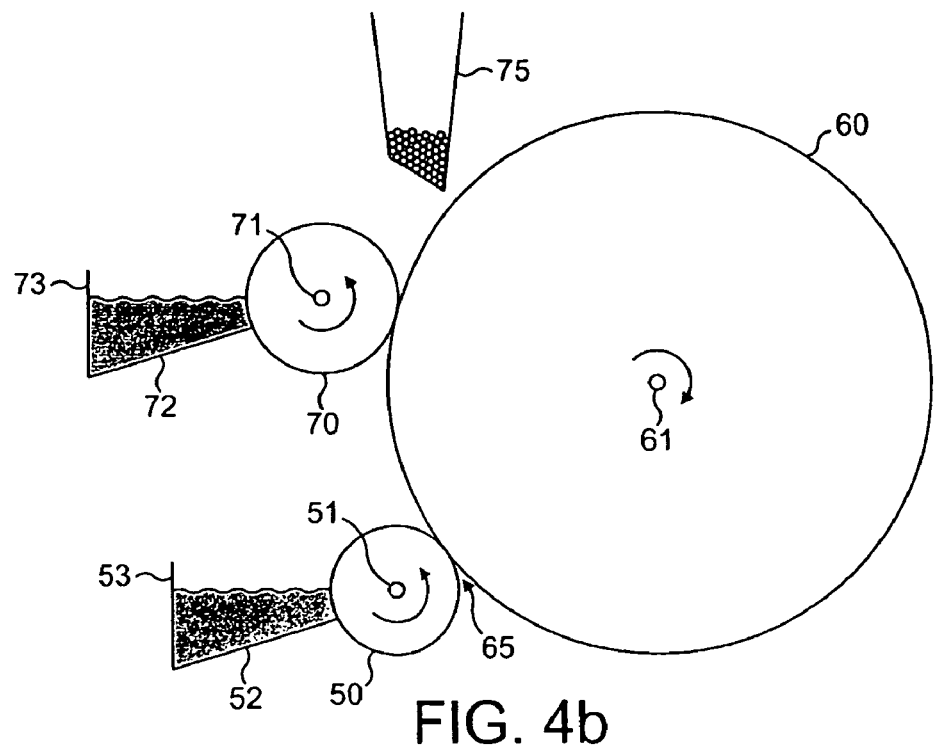
FIG. 4b shows an overview of a further system for the preparation of regular films.
Figure 4C:
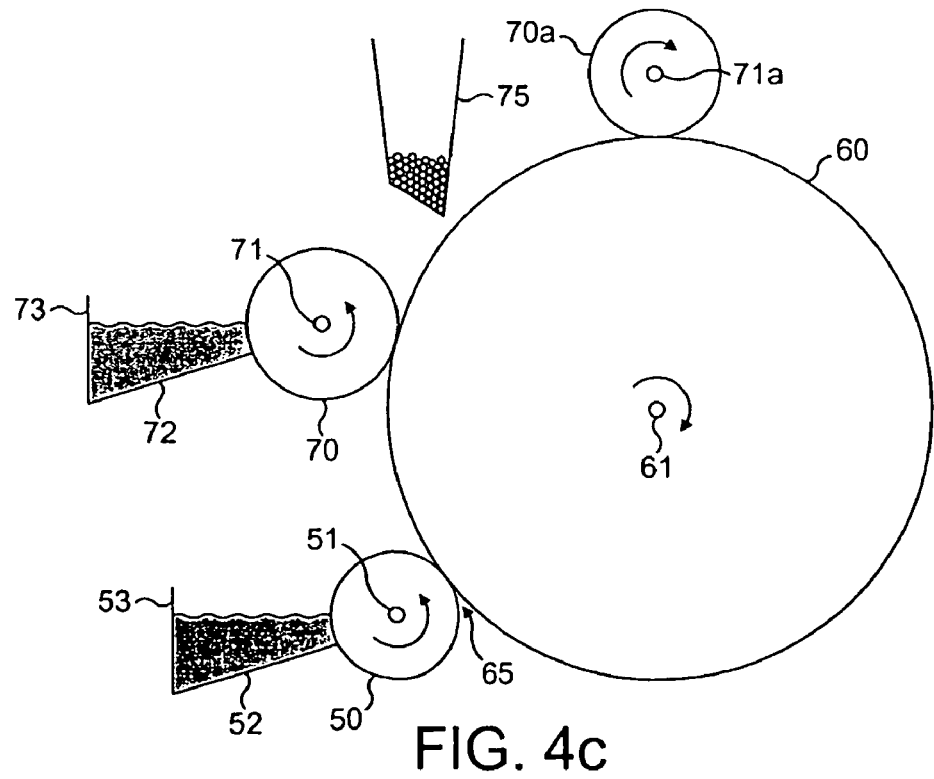
FIG. 4c shows an overview of another system for the preparation of regular films.
Figure 4D:
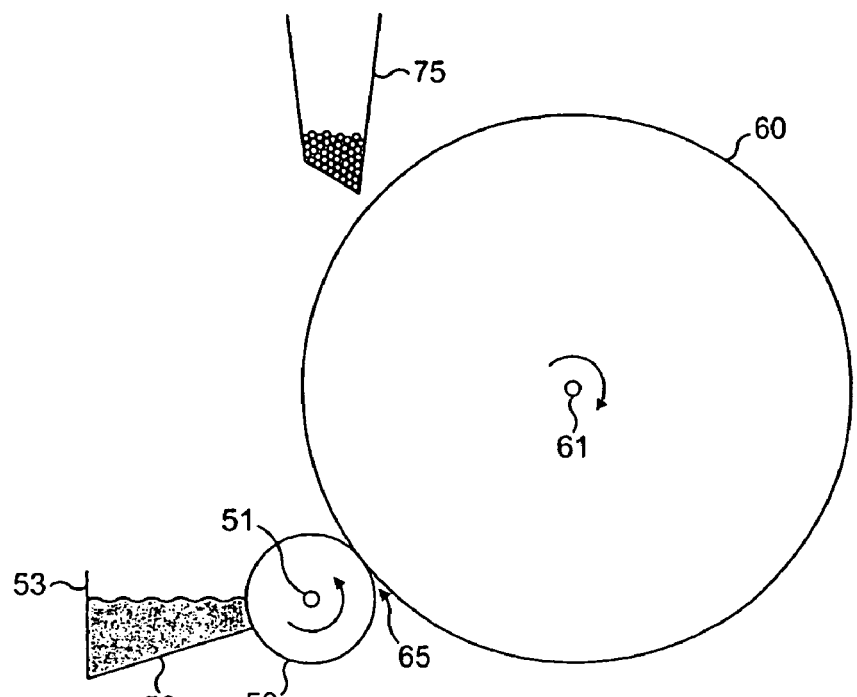
FIG. 4d shows an overview of another system for the preparation of regular films.
Figure 4E:
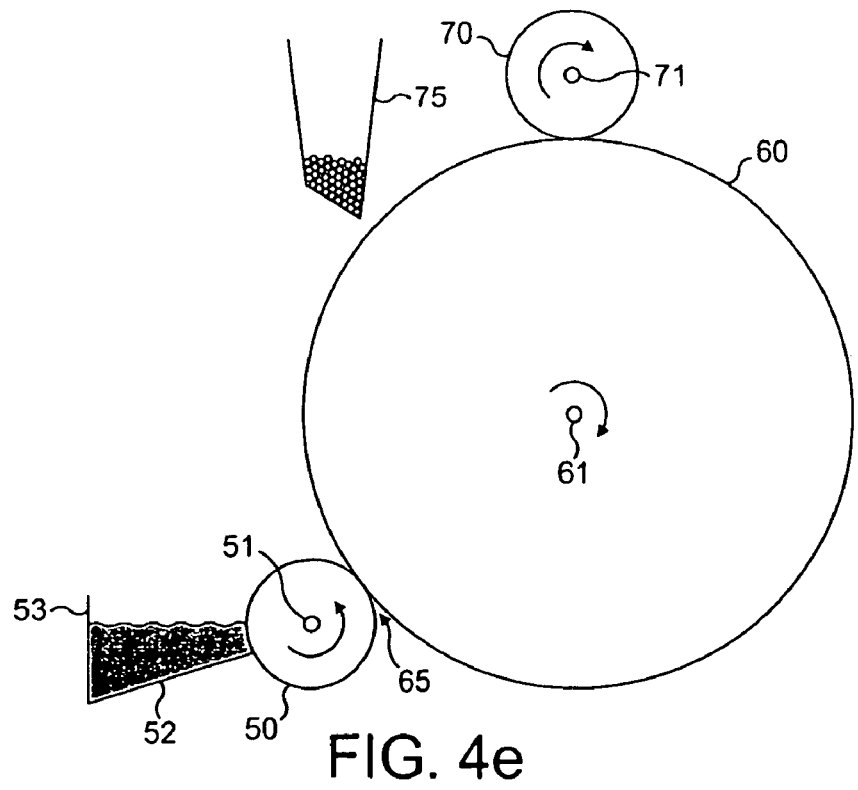
FIG. 4e shows an overview of another system for the preparation of regular films.
Figure 4F:
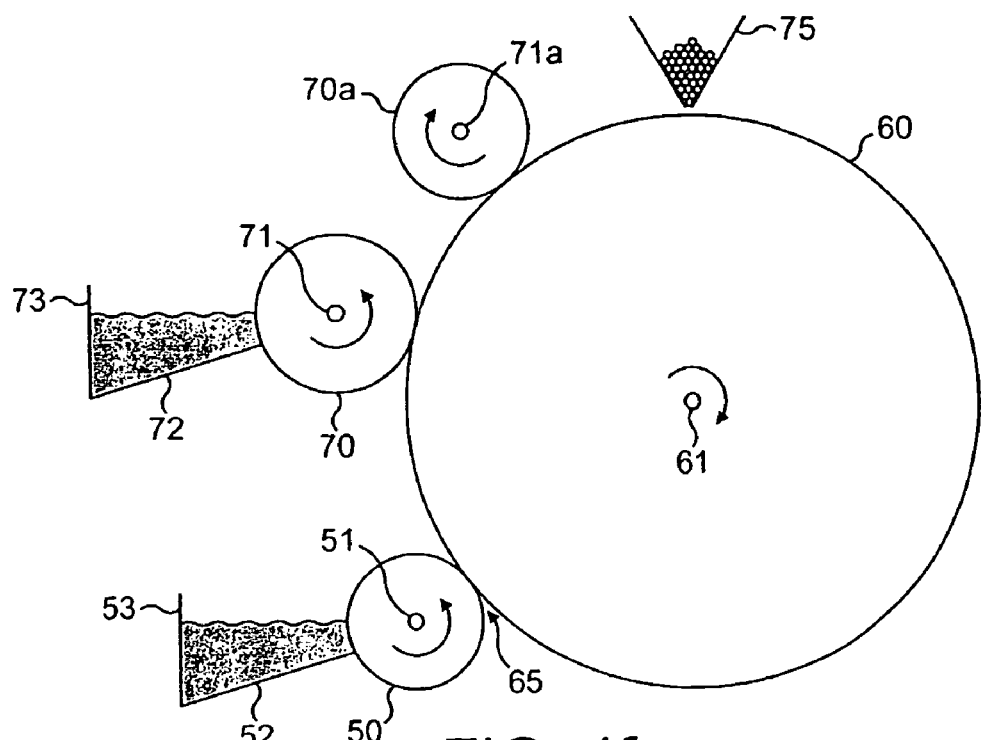
FIG. 4f shows an overview of another system for the preparation of regular films.

In an alternative arrangement shown in FIG. 4*a*, the third roll is used to apply a secondary component to the film of chocolate already on the second roll 60. This secondary component may be any suitable foodstuff (e.g. a cream, nougat, caramel, solid inclusion, further chocolate etc.) and is transferred to the second roll in a similar way to the chocolate layer. In this embodiment, the third roll will rotate in an anticlockwise direction (i.e. in the same direction as the first roll) to enable transfer of the second component to the second roll 60.

Of course, the invention is not limited to having a maximum of three rolls and more may be employed to either smooth out any striations in the film of two or more components or to add further components. Further solid components (e.g. nuts) may be added before or after the third roll. These may be added by any suitable means, for example a hopper placed above the second roller releasing solids at a controlled rate. FIGS. 4*b* to 4*f* show further non-limiting examples of possible systems. All satelite rolls have independent movement relative to each other and to the second roll. This enables films of different thicknesses to be produced, and the position of the addition of inclusions may be varied. The system is therefore extremely flexible and capable of producing a wide range of products. In these figures, the reference numeral 75 indicates a hopper for supplying solid inclusions to the second roll and reference numerals 70*a* and 71*a* represent further rolls and the axes of rotation.

A series of films running parallel to and touching each other may also be transferred from the first roll to the second roll through careful application of the liquid (e.g. chocolate) feed to the first roll. As an example, two or more different types of chocolate (e.g. plain, white, milk) may be supplied to the first roll in a controlled fashion (e.g. nozzles) whereby a series of parallel films are formed on the first roll. These films are subsequently transferred to the second roll by the mechanism described above. This could apply equally to alternating strips of chocolate and, for example, a flavoured cream or chocolate.

Figure 5:
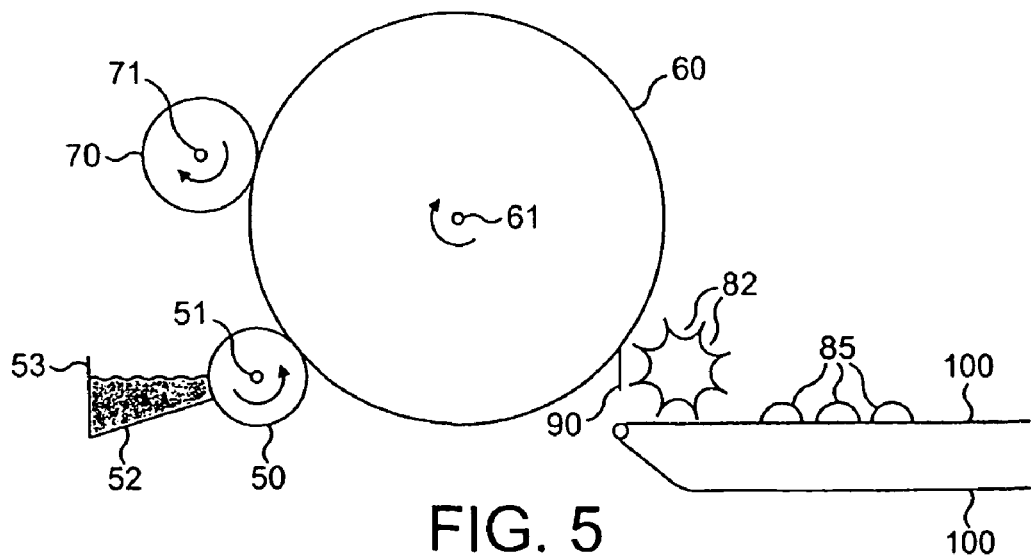
FIG. 5 shows an overview of a system for the preparation of a layered confectionery product.

FIG. 5 shows an apparatus for the production of a layered confectionery product, the apparatus including a first roll 50, second roll 60, and a third, burnishing roll 70 for producing a film of chocolate as described above. A rotary former 80 is moveably positioned adjacent the second roll 60, said former including a number of cavities 82 into which the chocolate may be fed from the second roll. Removing the film of chocolate from the surface of the second roll is a doctor blade 90 which is again moveable relative to both the second roll and to the former. As the film is removed from the second roll it feeds into the cavities of the former which generally rotates at a predetermined speed relative to the second roll. The relative speeds of the second roll and the rotary former control how much chocolate film is fed into each cavity and therefore the density and weight of each product.

The spatial arrangement between the second roll, the doctor blade, the doctor blade carrier and the rotary former can be altered to control the geometrical form of the layered or rippled product produced. In particular, the rotary former may be moved relative to the other components during filling to produce different structural arrangements within the cavities, thereby producing differed layered or rippled products (see, for example, FIGS. 7 to 11). The rotary former can, for example, be moved with a rocking action around its axis of rotation and this will guide the chocolate film into the cavities of the former in a predetermined fashion to form the required shape. Over the typical time period for transferring the chocolate film from the second roll into a cavity of the rotary former, which may be in the range of 0.1 to 5 seconds, the former may be moved a number of times relative to the second roll. These movements need not all be at the same speed and the overall control of the movements of the components is preferably controlled by an electronic motion control system. Over the time period referred to above, the net effect of the movements of the rotary former will be to rotate relative to the second roll so that the next empty cavity is presented to the second roll for the receipt of the chocolate film.

The position of the doctor blade around the circumference of the second roll may be varied as one of the means of control of the residence time of the film of chocolate on the second roll. This in turn will affect the physical properties of the film and may require amendments to the relative positions of the components to produce the desired product. In addition the angle at which the doctor blade sits relative to both the second roll and the former and take off belt may be altered between runs. This will control the angle at which the chocolate film is fed into the rotary former which, when combined with the movement of the former, will affect the geometric shape of the layered or rippled product produced. Once the position is set for a run, the doctor blade is not moved.

The products 85 are removed from the rotary former 80 by any suitable means (for example by gravitational means, suction means, physical means) on to a take-off belt 100. From there the products 85 may be passed to a conditioning tunnel where they may be subjected to further heating or cooling to solidify the layered product and/or to secure the desired component crystal structure. In addition, the layered products may be passed to an enrobing machine where the layered product may be coated with an additional layer of material, for example chocolate, for aesthetic reasons. After further cooling to harden the products, they may finally be passed to a wrapping machine where they are wrapped in the appropriate packaging. Although the take off belt 100 is shown in FIG. 5 as being in the same plane as the rolls 50, 60, 70 it could be at any angle to the former. It may therefore be at right angles to the former, taking the products off into the page for downstream processing.

Figure 6:
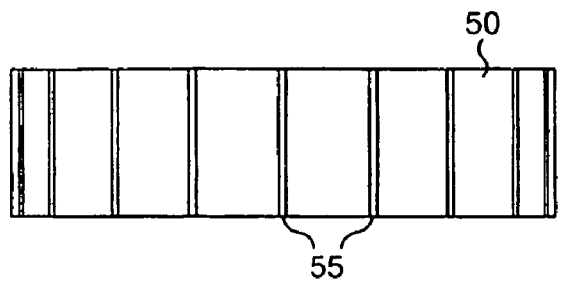
FIG. 6 shows a general view of a first roll according to the present invention.
Figure 7:
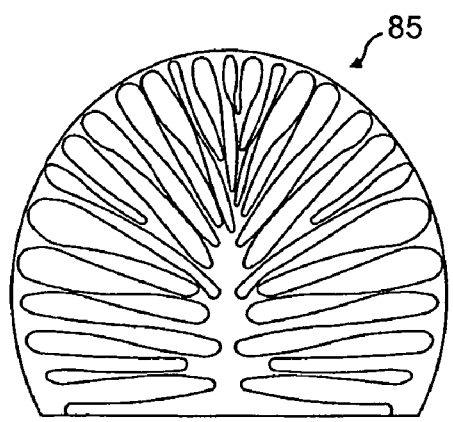
FIG. 7 shows a schematic cross section of a layered product according to the present invention.
Figure 8:
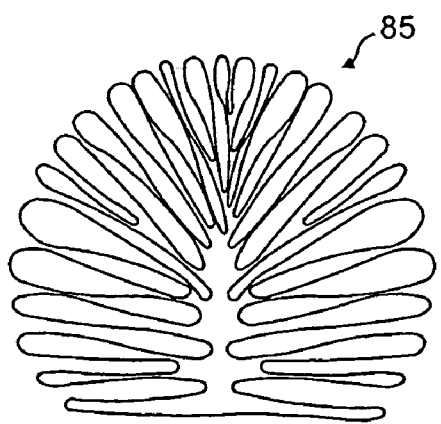
FIG. 8 shows a schematic cross section of another layered product according to the present invention.
Figure 9:
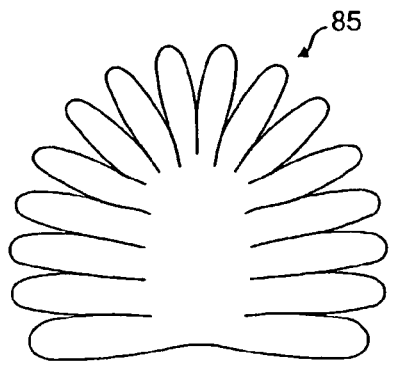
FIG. 9 shows a schematic cross section of another layered product according to the present invention.
Figure 10:
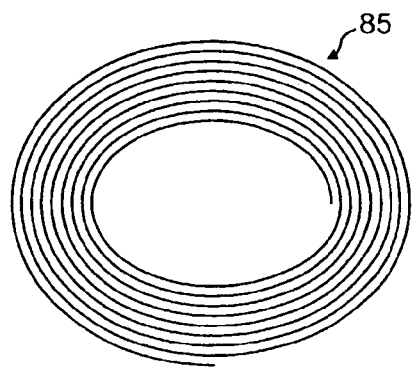
FIG. 10 shows a schematic cross section of another layered product according to the present invention.
Figure 11:
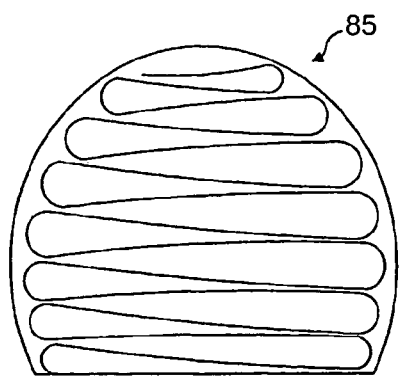
FIG. 11 shows a schematic cross section of another layered product according to the present invention.

The length of each product is preferably controlled by means of troughs on the outer surface of the first roll. Referring to FIG. 6, a first roll 50 is shown with a number of troughs 55 positioned along the length of the roll. These troughs are relatively shallow, but are sufficiently deep to prevent liquid chocolate adhering to them. The chocolate therefore only adheres to the outer circumference of the roll and forms a number of parallel films each separated by a small gap. This set of films is transferred to the second roll and subsequently to the products in the former. The advantage of this mechanism for controlling the length of the products compared with the castellated doctor blade of the prior art is that no chocolate is passed right round the second roll and therefore being re-worked.

As set out above, the relationship between the second roll 60, the doctor blade 90, the rotary former 80 and the take-off belt 100 controls the formation of the layered product. Different layered formations can be generated. In particular, the arrangement shown in FIG. 7 in which the film of chocolate first follows the complete contour of the cavity is preferred. This product may not require any additional enrobing thereby saving a step in the production and consequently reducing costs and operating time. Another preferred product is that shown in FIG. 10 in which the film forms a number of ever decreasing circles. This configuration of product is not possible using the methods of the prior art.

Although generally hemispherical cavities 85 are shown in the former 80 in FIG. 5, cavities of other shapes may also be used, for example triangles. The same principles as for the hemispherical cavities apply equally to the triangular cavity and different layered products may be produced by altering in real time the geometrical relationship between the second roll, the doctor blade, the doctor blade carrier and the rotary former. As set out above, the position of the rotary former relative to the other components can be altered a number of times every second. The rotary former can also move with a rocking action about its rotational axis which may assist in producing products such as that shown in FIG. 7.

Figure 12:
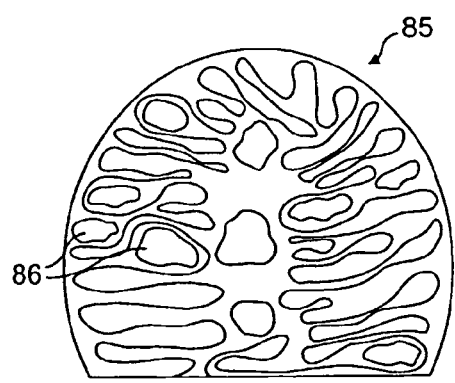
FIG. 12 shows a schematic cross section of another layered product according to the present invention.

FIG. 12 shows a schematic view of a layered product 85 including a number of solid inclusions 86 as secondary components. These may be selected from, for example fruit, nuts, biscuit pieces, inclusions of expanded malted milk confection, crispies, etc. As indicated above, secondary components when the first layer is a layer of chocolate may also include creams, nougat, caramel, ice cream and further layers of chocolate as well as solid inclusions. Any combination of the different types of components may also be selected and used in the present invention as desired.

The apparatus and method of the present invention have the flexibility to produce chocolate products of different densities by the simple adjustment of the forming time, variation of film thickness or a combination of these two.

While the present invention has been exemplified by reference to chocolate, the invention is not limited to this foodstuff. As indicated above, many other types of foodstuff can be used in the present invention including, but not limited to, sugar compositions, caramel, meat products, ice cream, wafer compositions and pet foods. The operating conditions will vary with the foodstuff being used, but the same general principle applies.

The invention claimed is:

1. Apparatus for producing a regular film of foodstuff, comprising a first roll on to which foodstuff is applied in fluid form, and an independent second roll spaced from the first by a distance $t_1$ on to which a film of foodstuff of thickness $t_1$ is applied by means of the first roll, and in which there is a temperature differential between the first and second rolls that is maintained with a heating and/or cooling source,
wherein the first roll is maintained with the heating and/or cooling source at a temperature in the range 10 to 55° C.; and
wherein the second roll is maintained with the heating and/or cooling source at a temperature in the range −20 to 30° C.

2. Apparatus as claimed in claim 1, further comprising an independent third roll separated from the second roll by a distance $t_2$ to smooth the film of foodstuff on the second roll.

3. Apparatus as claimed in claim 2, wherein the foodstuff is chocolate and wherein the third roll is maintained with the heating and/or cooling source at a higher temperature than the second roll.

4. Apparatus as claimed in claim 2, wherein the third roll is maintained with the heating and/or cooling source at a temperature in the range 10 to 55° C.

5. Apparatus as claimed in claim 2, wherein the first and third rolls are maintained with the heating and/or cooling source at the same temperature.

6. Apparatus as claimed in claim 2, wherein the distances $t_1$ and $t_2$ are in the range 0.01 to 20 mm.

7. Apparatus as claimed in claim 2, wherein the distances $t_1$ and $t_2$ are equal.

8. Apparatus as claimed in claim 2, wherein the first roll has a number of troughs on the surface of the roll substantially perpendicular to the axis of rotation of the roll.

9. Apparatus as claimed in claim 2, wherein the third roll is supplied with a second component which is applied to the second roll as a second film on top of the film applied by the first roll.

10. Apparatus as claimed in claim 9, wherein the second component is selected from the group consisting of creams, crushed nuts, inclusions of expanded malted milk confection, biscuit pieces, pieces of fruit, caramel, nougat, truffle, crispies, meringue pieces, further layers of chocolate, ice cream or any combination of the above.

11. Apparatus as claimed in claim 2, wherein the distances $t_1$ and $t_2$ are in the range 0.1 to 10 mm.

12. Apparatus as claimed in claim 2, wherein the distances $t_1$ and $t_2$ are in the range 0.2 to 0.8 mm.

13. Apparatus as claimed in claim 1, wherein the foodstuff is chocolate.

14. Apparatus as claimed in claim 13, wherein the second roll is at a lower temperature than the first roll.

15. Apparatus as claimed in claim 1, wherein the second roll is chilled by means of a coolant liquid passing through the center of the roll.

16. Apparatus as claimed in claim 1, wherein the foodstuff is a baked product composition.

17. Apparatus as claimed in claim 1, wherein the foodstuff is a sugar product.

18. Apparatus as claimed in claim 1, wherein the foodstuff is a pet food product.

19. Apparatus as claimed in claim 1, wherein at least one further satellite roll is present around the second roll to burnish the film(s) or to add further components.

20. Apparatus, according to claim 1, further comprising a doctor blade on the second roll to remove the film of foodstuff from the surface of this roll, and a rotary former including a number of cavities in which the foodstuff is collected.

21. Apparatus as claimed in claim 20, wherein the foodstuff is chocolate.

22. Apparatus as claimed in claim 21, wherein the rotary former is cooled.

23. Apparatus as claimed in claim 22, wherein the cooling is by means of liquid coolant passing through the center of the former.

24. Apparatus as claimed in claim 21, wherein the rotary former is maintained with the heating and/or cooling source at a temperature in the range −20 to 20° C.

25. Apparatus as claimed in claim 20, wherein the foodstuff is selected from the group consisting of baked product compositions, sugar products and pet food products.

* * * * *